US012738115B2

(12) United States Patent
Hung

(10) Patent No.: US 12,738,115 B2
(45) Date of Patent: Sep. 15, 2026

(54) CONTROL SYSTEM FOR AN ELECTRONIC LOCK AND OPERATION METHOD OF THE SAME

(71) Applicant: FIBRE INDUSTRY CO., LTD., Hsinchu City (TW)

(72) Inventor: Chen-Yu Hung, Hsinchu City (TW)

(73) Assignee: FIBRE INDUSTRY CO., LTD., Hsinchu City (TW)

( * ) Notice: Subject to any disclaimer, the term of this patent is extended or adjusted under 35 U.S.C. 154(b) by 3 days.

(21) Appl. No.: 19/025,438

(22) Filed: Jan. 16, 2025

(65) Prior Publication Data

US 2025/0246036 A1 Jul. 31, 2025

(30) Foreign Application Priority Data

Jan. 26, 2024 (TW) ................................ 113103166

(51) Int. Cl.
*G07C 9/22* (2020.01)
*G07C 9/00* (2020.01)
*H04L 9/32* (2006.01)

(52) U.S. Cl.
CPC ........... *G07C 9/22* (2020.01); *G07C 9/00309* (2013.01); *H04L 9/3236* (2013.01); *H04L 9/3247* (2013.01); *G07C 2009/00793* (2013.01); *G07C 2209/64* (2013.01)

(58) Field of Classification Search
CPC ...... G07C 2009/00793; G07C 2209/64; G07C 9/00309; G07C 9/22; H04L 9/3236; H04L 9/3247
See application file for complete search history.

(56) References Cited

U.S. PATENT DOCUMENTS

2012/0077468 A1* 3/2012 Fan .................... G07C 9/00309 70/91
2014/0077929 A1* 3/2014 Dumas .............. G07C 9/00571 340/5.61
2022/0335764 A1* 10/2022 Imanuel ............. H04L 63/0823

FOREIGN PATENT DOCUMENTS

WO 2020007339 A1 1/2020
WO 2023280277 A1 1/2023

OTHER PUBLICATIONS

Search Report appended to an Office Action, which was issued to Taiwanese counterpart application No. 113103166 by the TIPO on Jul. 30, 2024, with an English translation thereof (2 pages).

* cited by examiner

*Primary Examiner* — Omer S Khan
(74) *Attorney, Agent, or Firm* — HSML P.C.

(57) ABSTRACT

A control system for an electronic lock includes a control module. The electronic lock has a locked state and an unlocked state. The control module is configured to communicate with a portable device for receiving an unlock request that includes a digital signature and a request identifier therefrom. The control module includes a processing unit and a storage electrically connected to the processing unit. The storage stores a key and a registered identifier. The processing unit is configured to, in response to receipt of the unlock request, verify the digital signature using the key, in response to successfully verifying the digital signature, determine whether the request identifier matches the registered identifier, and in response to determining that the request identifier matches the registered identifier, control the electronic lock to switch from the locked state to the unlocked state.

10 Claims, 3 Drawing Sheets

CONTROL SYSTEM FOR AN ELECTRONIC LOCK AND OPERATION METHOD OF THE SAME

CROSS-REFERENCE TO RELATED APPLICATION

This application claims priority to Taiwanese Invention Patent Application No. 113103166, filed on Jan. 26, 2024, the entire disclosure of which is incorporated by reference herein.

FIELD

The disclosure relates to a control system for an electronic lock and an operation method of a control system for an electronic lock.

BACKGROUND

In currently existing technology, there are two common types of door locks, namely key door locks and electronic door locks. Unlocking methods of conventional electronic locks include password unlocking, biometric unlocking, wireless sensor unlocking, etc.

Further improvements can still be made to enhance security and convenience of conventional electronic locks.

SUMMARY

Therefore, an object of the disclosure is to provide a control system for an electronic lock and an operation method of a control system for an electronic lock that can alleviate at least one of the drawbacks of the prior art.

According to an aspect of the disclosure, the electronic lock is mounted on a door, and has a locked state that prevents the door from being opened and an unlocked state that allows the door to be opened. The control system includes a control module that includes a processing unit and a storage. The control module is configured to communicate with a portable device for receiving an unlock request that includes a digital signature and a request identifier therefrom. The processing unit is adapted to be electrically connected to the electronic lock. The storage is electrically connected to the processing unit and stores a key and a registered identifier. The processing unit is configured to, in response to receipt of the unlock request, verify the digital signature included in the unlock request using the key stored in the storage. The processing unit is further configured to, in response to successfully verifying the digital signature, determine whether the request identifier included in the unlock request matches the registered identifier stored in the storage. The processing unit is further configured to, in response to determining that the request identifier matches the registered identifier, control the electronic lock to switch from the locked state to the unlocked state.

According to another aspect of the disclosure, the control system includes a control module configured to communicate with a portable device for receiving an unlock request therefrom. The unlock request includes a digital signature and a request identifier. The control module includes a processing unit and a storage that is electrically connected to the processing unit. The processing unit is electrically connected to the electronic lock. The storage stores a key and a registered identifier. The electronic lock is mounted on a door, and has a locked state for preventing the door from being opened and an unlocked state for allowing the door to be opened. The operation method includes: by the processing unit, in response to receipt of the unlock request, verifying the digital signature included in the unlock request using the key stored in the storage; by the processing unit, in response to successfully verifying the digital signature, determining whether the request identifier included in the unlock request matches the registered identifier stored in the storage; and by the processing unit, in response to determining that the request identifier matches the registered identifier, controlling the electronic lock to switch from the locked state to the unlocked state.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
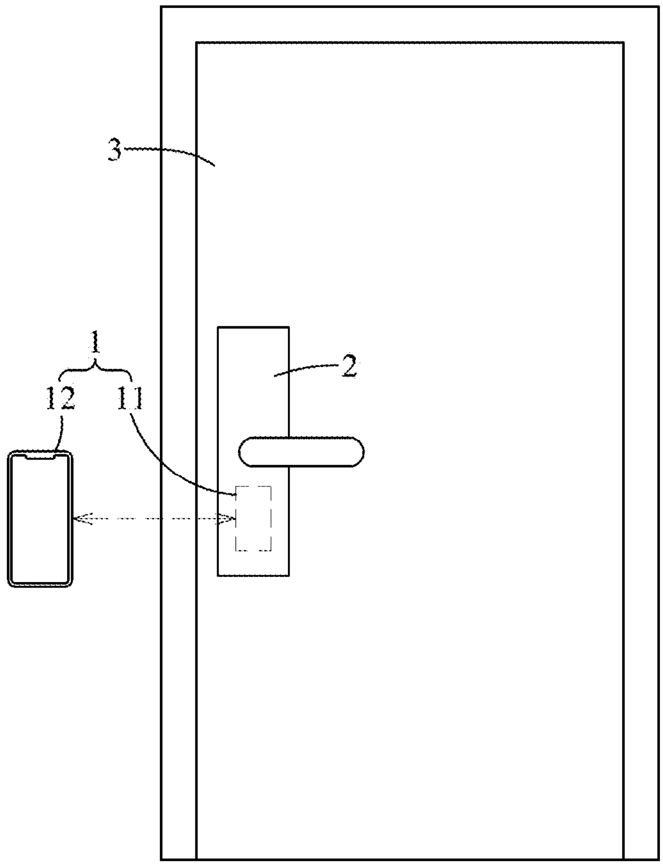
FIG. 1 is a schematic diagram illustrating a control system for an electronic lock in application with an electronic lock that is mounted on a door according to an embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

Throughout the disclosure, the term "module" and "unit" both refer to electronic component. For example, a "processing unit" may refer to an electronic component with data processing capabilities. Additionally, in this disclosure, the term "unit" may refer to a single electronic component with a specific function, or a group of electronic components with similar functions. For example, a "processing unit" may refer to a single processor with data processing capabilities, or a collection of processors.

Referring to FIG. 1, a control system 1 for an electronic lock according to an embodiment of the present disclosure is implemented on an electronic lock 2 for controlling the electronic lock 2. The electronic lock 2 is mounted on a door 3. For example, the door 3 may be a residential door or a building entrance door, or may be any type of door as long as the door is mounted with an electronic lock. The electronic lock 2 has a locked state that prevents the door 3 from being opened, and an unlocked state that allows the door 3 to be opened. The electronic lock 2 may be exemplified as a conventional electric mortice lock, a conventional magnetic lock, or any other electronic lock that can be driven by an electrical signal to switch between the locked state and the unlocked state.

In this embodiment, the control system 1 includes a control module 11 adapted to be electrically connected to the electronic lock 2, and a portable device 12 wirelessly connected to the control module 11. The control module 11 and the portable device 12 are wirelessly connected and communicate with each other using short range wireless (SRW) communication technology. In this embodiment, the control module 11 and the portable device 12 are wirelessly connected and communicate with each other using Bluetooth® communication technology, but communication is not limited to this example.

In this embodiment, the control module 11 is disposed inside the electronic lock 2, and the control module 11 and the electronic lock 2 form at least part of a door lock assembly. In other words, in this embodiment, the control module 11 and the electronic lock 2 are both included in the door lock assembly (i.e., each of the control module 11 and the electronic lock 2 is a component of the door lock assembly). However, in other embodiments, the control module 11 may be disposed on the door 3 or inside the door 3 separately from the electronic lock 2. Specifically, a way of disposing the control module 11 is not limited to this disclosure as long as the control module 11 is electrically connected to the electronic lock 2.

Figure 2:
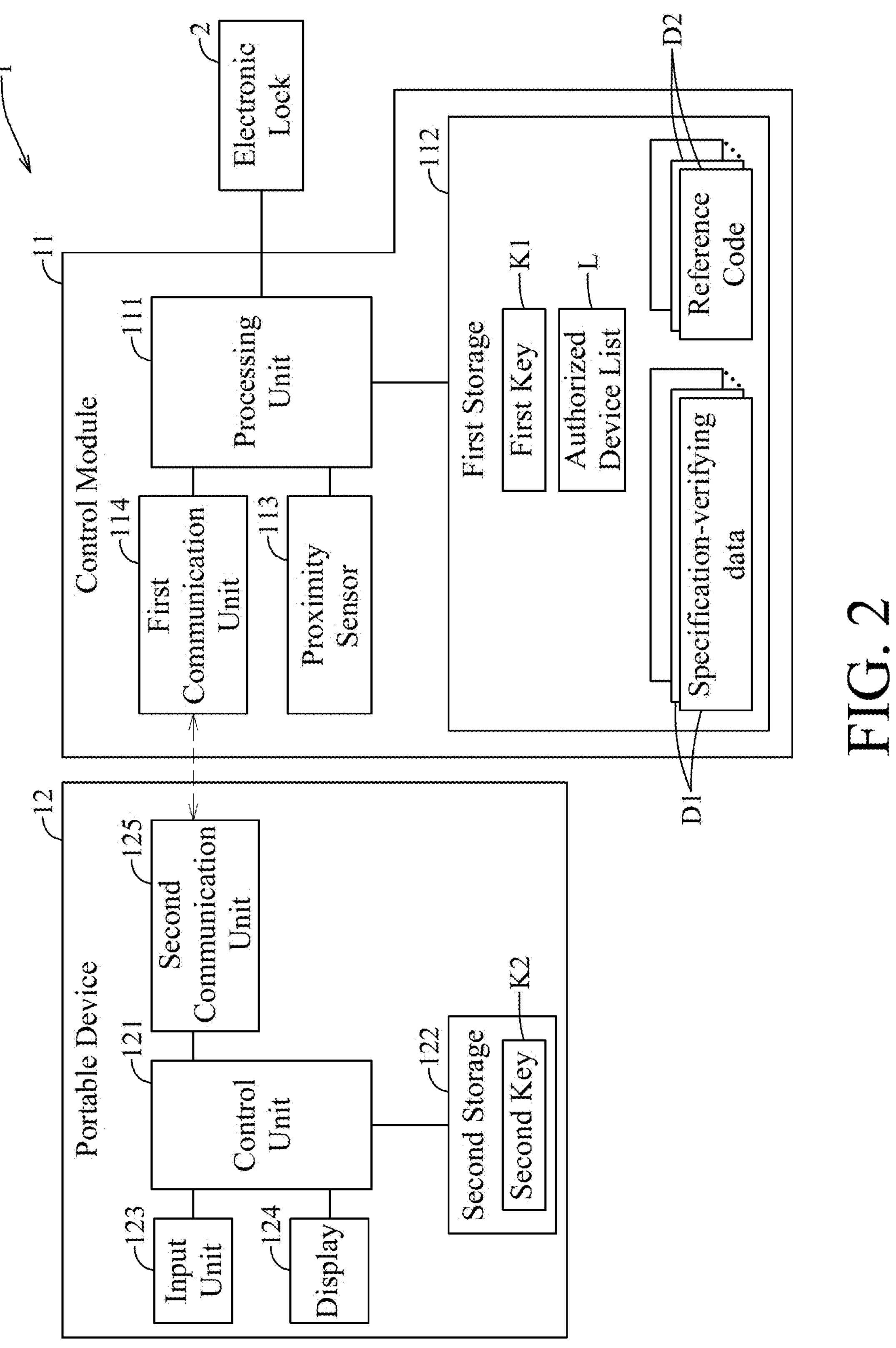
FIG. 2 is a block diagram of the control system connected to the electronic lock according to an embodiment of the present disclosure.

Referring to FIGS. 1 and 2, the control module 11 includes a processing unit 111 adapted to be electrically connected to the electronic lock 2, and a first storage 112, a proximity sensor 113 and a first communication unit 114 that are electrically connected to the processing unit 111.

The processing unit 111 is exemplified by a processor that is realized by an integrated circuit and that has a function of command transmission and reception. The first storage 112 is exemplified by a computer-readable storage medium capable of storing digital data. For example, the first storage 112 is exemplified as a static random-access memory (SRAM), but is not limited to such. In this embodiment, the processing unit 111 and the first storage 112 together form parts of a secure cryptoprocessor, but this aspect is not limited to this disclosure.

The processing unit 111 is configured to control the electronic lock 2 to switch between the locked state and the unlocked state. Specifically, when the electronic lock 2 is in the locked state, a bolt of the electronic lock 2 (not shown) is inserted into a strike plate mounted on a door frame (not shown), such that the electronic lock 2 restricts a movement of the door 3, preventing the door 3 from rotating relative to the door frame. Conversely, when the electronic lock 2 is in the unlocked state, the bolt is retracted such that the electronic lock 2 does not restrict the movement of the door 3. In other words, when the electronic lock 2 is in the locked state, a user may not open the door 3, and when the electronic lock 2 is in the unlocked state, the user may open the door 3.

The door 3 has two sides (i.e., one side facing inside and another side facing outside with respect to an enclosed space where the door 3 is mounted). The proximity sensor 113 is configured to detect presence of a nearby object around one of the two sides of the door 3, and to output a detection signal indicating a detection result to the processing unit 111; specifically, the detection signal indicates whether there is an object currently within a distance smaller than a predetermined distance (e.g., 80 cm) from the proximity sensor 113. The one of the two sides of the door 3 may be, for example, the side that is facing outside with respect to the enclosed space (e.g., a house or a building). In this embodiment, the proximity sensor 113 is exemplified as a digital infrared (IR) proximity sensor. However, in other embodiments, the proximity sensor 113 may be exemplified by, for example, a laser distance sensor or a millimeter wave (mmWave) radar sensor, but is not limited to these.

In this embodiment, the first communication unit 114 is exemplified by a Bluetooth® communication module that complies with the IEEE 802.15 communication standard, and is configured to emit Bluetooth signals toward the one of the two sides of the door 3, for example, the side that faces outside with respect to the enclosed space. A way of allowing the Bluetooth signals to be emitted in the one of the two sides of the door 3 may be through, for example, adding a shielding component (e.g., copper foil or graphite sheets) to block or absorb the Bluetooth signals emitted toward the other one of the two sides of the door 3. The way of allowing the Bluetooth signals to be emitted in certain directions is well known in the art, so details thereof are omitted herein for the sake of brevity. Specifically, the processing unit 111 transmits and receives data wirelessly through the first communication unit 114.

The first storage 112 stores a key (K1), an authorized device list (L), plural sets of specification-verifying data (D1) respectively for verifying a plurality of communication specifications, and a plurality of reference codes (D2) that correspond respectively to the communication specifications.

For illustration purposes, in this disclosure, the key (K1) stored in the first storage 112 will hereinafter be referred to as "the first key (K1)". The first key (K1) is exemplified as a private key used in asymmetric cryptography, and the first key (K1) is, for example, issued by a certificate authority (CA).

The authorized device list (L) includes at least one registered identifier (not shown). For example, each registered identifier is a string of codes that corresponds to an electronic device. Specifically, each registered identifier represents an electronic device that is authorized to unlock the electronic lock 2. In other words, the authorized device list (L) provides a record of which electronic devices are authorized to unlock the electronic lock 2.

The communication specifications are related respectively to different types of data format. In this embodiment, the communication specifications are related respectively to different types of programming languages such as C++ and ActionScript. Specifically, for each of the communication specifications, the type of data format corresponding to the communication specification refers to a syntax of the programming language that is related to the communication specification, and the set of specification-verifying data (D1) is used to verify whether a message is written in the programming language; for example, the set of specification-verifying data (D1) for verifying the communication specification related to C++ includes a standard header provided by the C++ Standard Library. Each of the reference codes (D2) indicates a respective one of the communication specifications for communication. That is to say, each of the reference codes (D2) indicates a respective one of the programming language to be used to write messages for communication. However, in other embodiments, the communication specifications may be related respectively to different data types or different encryption methods, and are not limited to different programming languages or the examples provided in this disclosure.

In this embodiment, the portable device 12 is exemplified as a smart mobile device (e.g., a smartphone), and the portable device 12 is, for example, pre-installed with a specific application program. Specifically, the portable device 12 performs wireless communication with the control module 11 by way of the portable device 12 executing the specific application program. Moreover, the specific application program is, for example, set to run as a background process (or daemon) in the portable device 12. In other words, as long as the portable device 12 is powered on, the specific application program will continue to operate in the background.

The portable device 12 includes a control unit 121, and a second storage 122, an input unit 123, a display 124 and a second communication unit 125 that are electrically connected to the control unit 121.

The control unit 121 is exemplified by a processor that is realized by an integrated circuit and that has the function of command transmission and reception. The second storage 122 is exemplified by a computer-readable storage medium capable of storing digital data. For example, the second storage 122 is exemplified as a static random-access memory (SRAM), but is not limited to such. In this embodiment, similar to the processing unit 111 and the first storage 112, the control unit 121 and the second storage 122 together form parts of a secure cryptoprocessor, but this aspect is not limited to this disclosure.

The input unit 123 is used for a user to operate on, and the display 124 is used for displaying an operating interface, images or texts. Moreover, in this embodiment, the input unit 123 and the display 124 are integrated into a touch screen, but are not limited in this respect.

The second communication unit 125 is exemplified by a Bluetooth® communication module that complies with the IEEE 802.15 communication standard, similar to the first communication unit 114 of the control module 11. When the second communication unit 125 is activated (i.e., a Bluetooth communication function of the portable device 12 is turned on), the control unit 121 receives and transmits data wirelessly through the second communication unit 125. Moreover, when the portable device 12 and the control module 11 are within a communication range of each other, the control unit 121 of the portable device 12 and the processing unit 111 of the control module 11 may communicate with each other respectively through the second communication unit 125 and the first communication unit 124 using Bluetooth communication.

The second storage 122 stores another key (K2). For illustration purposes, the another key (K2) will hereinafter be referred to as "the second key (K2)". The second key (K2) is exemplified as a public key used in asymmetric cryptography, and the second key (K2) is, for example, issued by the CA. The second key (K2) and the first key (K1) that is stored in the control module 11 are a pair of related keys. That is to say, the second key (K2) and the first key (K1) have a mathematical relationship in asymmetric cryptography. Since the mathematical relationship between the second key (K2) and the first key (K1) is well known in the field of asymmetric encryption, further descriptions thereof will be omitted for the sake of brevity.

In some embodiments, the processing unit 111 of the control module 11 automatically updates the first key (K1) regularly. After the first key (K1) has been updated by the processing unit 111, when the control unit 121 of the portable device 12 establishes wireless communication with the processing unit 111, the processing unit 111 transmits update data corresponding to the first key (K1) that has been updated to the control unit 121. In response to receiving the update data, the control unit 121 updates the second key (K2) based on the update data, so as to maintain the mathematical relationship between the first key (K1) and the second key (K2). However, in other embodiments, the first key (K1) and the second key (K2) need not to be automatically updated regularly.

In some embodiments, the portable device 12 may be exemplified by a wearable smart electronic device such as a smart watch or smart glasses, and is not limited in this respect.

Figure 3:
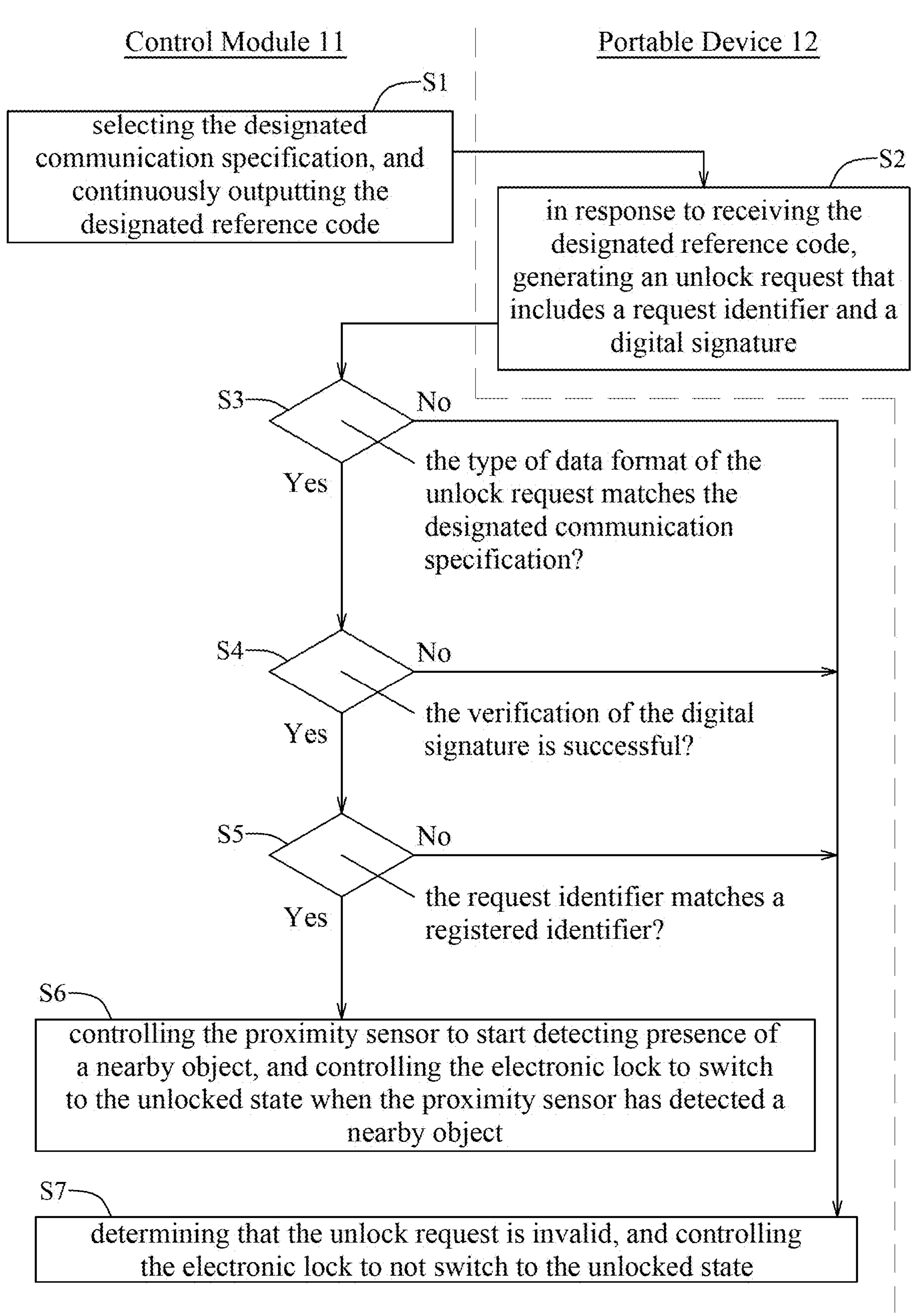
FIG. 3 is a flowchart of an operation method of the control system.

Referring to FIGS. 1 to 3, an operation method of the control system 1 is illustrated below. The operation method includes steps S1 to S7. It should be noted that the electronic lock 2 is in the locked state before the method is implemented.

In step S1, the processing unit 111 selects one of the communication specifications as a designated communication specification, and continuously outputs one of the reference codes (D2) that corresponds to the designated communication specification thus selected (hereinafter referred to as "the designated reference code (D2)") through the first communication unit 114. For example, the processing unit 111 pushes the designated reference code (D2) through the first communication unit 114. The designated communication specification represents rules to be followed by any electronic device the next time the electronic device wishes to perform wireless communication with the control module 11. In this embodiment, the designated communication specification represents the programming language to be used in writing a message for communication the next time the electronic device wishes to perform wireless communication with the control module 11, but is not limited in this respect.

In some embodiments, the processing unit 111 may, for example, select the designated communication specification to be used for a next wireless communication randomly from among the communication specifications after each wireless communication ends. However, in other embodiments, the processing unit 111 may, for example, select one of the communication specifications as the designated communication specification to be used for the next wireless communication sequentially according to a predetermined sequence of the communication specifications after each wireless communication ends. In other embodiments, the processing unit 111 may regularly select one of the communication specifications as the designated communication specification in a random manner or according to the predetermined sequence of the communication specifications. It should be noted that a way of the processing unit 111 selecting the designated communication specification from among the communication specifications is not limited to this disclosure.

As the processing unit 111 continuously and wirelessly outputs the designated reference code (D2), the flow goes to step S2.

In step S2, in response to the control unit 121 of the portable device 12 wirelessly receiving, through the second communication unit 125, the designated reference code (D2) outputted by the processing unit 111, the control unit 121 generates an unlock request based on the designated communication specification that corresponds to the designated reference code (D2), and wirelessly transmits the unlock request thus generated to the processing unit 111 of the control module 11 through the second communication unit 125. Specifically, the specific application program pre-installed in the portable device 12 has the relationship between the reference codes (D2) and the communication specifications, and accordingly, the control unit 121 of the portable device 12 is capable of generating the unlock request based on the designated communication specification in response to receipt of the designated reference code (D2) when the control unit 121 is executing the specific application program. In some embodiments, the second storage 122 further stores a plurality of pre-written requests that are pre-generated respectively based on the communication specifications. In such embodiments, when the control unit 121 of the portable device 12 receives the designated reference code (D2), the control unit 121 generates the unlock request by selecting one of the pre-written requests that corresponds to the designated reference code (D2) as the unlock request to be transmitted. Also in such embodiments, when the second key (K2) is updated in response to receipt of the update data from the processing unit 111 of the control module 11, the pre-written requests are re-generated as well based on the second key (K2) that is updated.

In this embodiment, since the unlock request is generated by the control unit 121 based to the designated communication specification, an overall type of data format of the unlock request matches the syntax of the programming language that is related to the designated communication specification. The unlock request includes a command part, a request identifier, and a digital signature. Specifically, each of the pre-written requests includes a command part, a request identifier, and a digital signature.

The command part at least includes an unlock command that is recognizable by the processing unit 111 and that indicates to the processing unit 111 to unlock the electronic lock 2 (i.e., control the electronic lock 2 to switch to the unlocked state).

The request identifier is a unique identification code for the processing unit 111 to recognize the portable device 12. The request identifier may be exemplified as, for example, a user identification (ID) that is uniquely bound to the portable device 12 through the specific application program. However, in other embodiments, the request identifier may be exemplified as, for example, the international mobile equipment identity (IMEI) of the portable device 12, but is not limited to thus. It should be noted that each registered identifier included in the authorized device list (L) has a format corresponding to that of the request identifier; that is to say, the registered identifier may be a user ID bound to an electronic device, or an IMEI of an electronic device.

The digital signature is generated by the control unit 121 at least based on the request identifier, the second key (K2), and a hash function (e.g., but not limited to, a hash function of the secure hash algorithms (SHA) family). For example, the control unit 121 first generates a device-end hash value based on the request identifier using the hash function, and then encrypts the device-end hash value using the second key (K2) to generate the digital signature.

It should be noted that, in this embodiment, the portable device 12 has a standby mode. In the standby mode, the display 124 is turned off (sleep mode) and the control unit 121 operates the specific application program continuously in the background. The portable device 12 is configured to automatically receive the designated reference code (D2) from the processing unit 111, generate the unlock request and transmit the unlock request when the portable device 12 is in the standby mode. In other words, when the portable device 12 is within the communication range where the portable device 12 is able to communicate wirelessly with the processing unit 111, the control unit 121 receives the designated reference code (D2) from the processing unit 111. At this time, even if the portable device 12 is in the standby mode, the control unit 121 automatically generates the unlock request according to the designated reference code (D2) without the need for any manual operation by the user.

When the control unit 121 of the portable device 12 wirelessly outputs the unlock request through the second communication unit 125, the flow goes to step S3.

In step S3, in response to the processing unit 111 wirelessly receiving the unlock request outputted by the control unit 121 through the first communication unit 114, the processing unit 111 determines whether a type of data format of the unlock request matches the designated communication specification based on one of the plural sets of specification-verifying data (D1) that corresponds to the designated communication specification. Specifically, the processing unit 111 determines whether the type of data format of the unlock request matches the syntax of the programming language that is related to the designated communication specification based on the corresponding set of specification-verifying data (D1). For example, in the case that the communication specification related to C++ is selected as the designated communication specification, the processing unit 111 determines whether the type of data format of the unlock request matches the syntax of C++ by determining whether the unlock request includes the standard header. In some embodiments, for example, in the case that the communication specification related to C++ is selected as the designated communication specification, the processing unit 111 executes a software program for processing a signal written in C++ programming language, such that the processing unit 111, at this time, is only able to process the unlock request that is written in C++. In such embodiments, the processing unit 111 determines that the type of data format of the unlock request matches the designated communication specification when the processing unit 111 successfully processes the unlock request that is received. If the determination is affirmative, the flow goes to step S4. If the determination is negative, the flow goes to step S7.

In step S4, in response to the processing unit 111 determining that the type of data format of the unlock request matches the designated communication specification, the processing unit 111 further verifies the digital signature using the first key (K1) in order to confirm the integrity and non-repudiation of the unlock request. If the determination of the processing unit 111 is affirmative (i.e., successfully verifying the digital signature), the flow goes to step S5. If the determination of the processing unit 111 is negative, the flow goes to step S7.

A way of the processing unit 111 verifying the digital signature is by, the processing unit 111 first generating a verification-end hash value based on the request identifier using the hash function, using the first key (K1) to decrypt the digital signature in order to obtain the device-end hash value, and comparing the verification-end hash value with the device-end hash value. If the verification-end hash value and the device-end hash value are identical to each other, the processing unit 111 determines that the verification of the digital signature is successful; the processing unit 111 determines that the verification of the digital signature is not successful if otherwise.

In step S5, in response to the processing unit 111 determining that the verification of the digital signature is successful, the processing unit 111 further determines whether the request identifier included in the unlock request matches any one of the at least one registered identifier included in the authorized device list (L). If the determination is affirmative, the flow goes to step S6. If the determination is negative, the flow goes to step S7.

In step S6, in response to the processing unit 111 determining that the request identifier included in the unlock request matches a registered identifier included in the authorized device list (L), the processing unit 111 controls the proximity sensor 113 to start detecting presence of a nearby object, and continuously receives the detection signal from the proximity sensor 113 in real time. When the processing unit 111 determines that the proximity sensor 113 has detected a nearby object based on the detection signal, the processing unit 111 controls the electronic lock 2 to switch from the locked state to the unlocked state, allowing the user to be able to manually open the door 3. In some embodiments, the processing unit 111 may control the proximity sensor 113 to start detecting presence of a nearby object at any point of the flow before step S6. In the case where the proximity sensor 113 is already detecting presence of a nearby object before step 6, when the flow goes to step 6, the processing unit 111 controls the electronic lock 2 to switch from the locked state to the unlocked state in response to determining that the request identifier included in the unlock request matches a registered identifier included in the authorized device list (L) and that the proximity sensor 113 has detected a nearby object.

By virtue of the processing unit 111 only controlling the electronic lock 2 to switch to the unlocked state when the processing unit 111 determines that the proximity sensor 113 has detected a nearby object, the control system 1 of this disclosure is able to unlock the electronic lock 2 only when the user is physically near to the door 3. With this configuration, even if the communication range where the portable device 12 and the control module 11 are able to wirelessly communicate with each other is, for example, more than 10 meters, the control system 1 of this disclosure is able to avoid unlocking the electronic lock 2 before the user is physically near (e.g., less than 80 centimeters distance) to the door 3, thereby avoiding potential security concerns.

As indicated above, when the processing unit 111 determines that the type of data format of the unlock request does not match the designated communication specification (step S3), or the verification of the digital signature is not successful (step S4), or the request identifier included in the unlock request does not match any registered identifier included in the authorized device list (L), the flow goes to step S7. In step S7, the processing unit 111 determines that the unlock request is invalid, and controls the electronic lock 2 to not switch to the unlocked state, so that the door 3 remains unable to be opened. Optionally, the processing unit 111 may, for example, output a failure notification through the electronic lock 2 or through the portable device 12; for example, in response to determining that the unlock request is invalid, the processing unit 111 controls the electronic lock 2 to output an alarm (e.g., a warning sound, light or message), or transmits a signal to the portable device 12 for the portable device 12 to output an alarm (e.g., a warning sound, light or message).

The above is an example of how the control system 1 of this disclosure implements the operation method of the control system 1.

It is worth noting that, in this embodiment, the processing unit 111 actively changes the designated communication specification applicable for the next wireless communication, and sets a prerequisite for controlling the electronic lock 2 to switch to the unlocked state (i.e., the type of data format of the unlock request matching the designated communication specification). Therefore, the control system 1 of this disclosure is able to prevent malicious individuals from recording the unlock request outputted by the portable device 12 and using the unlock request thus recorded to try to unlock the electronic lock 2.

Besides that, in this embodiment, since the portable device 12 is able to automatically receive the designated reference code (D2), generate the unlock request and output the unlock request when the portable device 12 is in the standby mode, a user need only to bring the portable device 12 close to the door 3 for the control unit 121 to control the electronic lock 2 to switch to the unlocked state without the need for any manual operations on the portable device 12. Therefore, the control system 1 of this disclosure significantly enhances the convenience of a wireless sensing unlocking mechanism of the electronic lock 2.

It should be noted that the sequence of steps S1 to S7 and the flowchart shown in FIG. 3 according to this embodiment are used only to illustrate one possible implementation of the operation method of the control system 1 of the present disclosure. It should be understood that when steps S1 to S7 are merged, split, or adjusted in sequence, if the flow of the process after merging, splitting or adjusting in sequence, when compared to this embodiment, is related to performing a similar function, in a similar way, to obtain a similar result, the flow is still an embodiment of this present disclosure. Therefore, the sequence of steps S1 to S7 and the flowchart shown in FIG. 3 are not intended to limit the scope of this present disclosure.

To add on, in some embodiments, the control system 1 is implemented as the control module 11 itself; that is to say, the portable device 12 is not a part of the control system 1. In a case where the control system 1 is implemented as only the control module 11, step S2 is not considered as a part of the operation method of the control system 1 of the present disclosure.

In summary, the control module 11 of the control system 1 according to an embodiment of the present disclosure, in response to wirelessly receiving the unlock request, controls the electronic lock 2 mounted on the door 3 to switch from the locked state to the unlocked state when the control module 11 determines that the verification of the digital signature included in the unlock request is successful, and that the request identifier included in the unlock request matches with one registered identifier included in the authorized device list (L). By virtue of the aforementioned configuration, the control system 1 allows a user to use the portable device 12 as a wireless sensing medium to unlock the electronic lock 2.

Additionally, the control system 1 of this disclosure utilizes a digital signature verification mechanism described in steps S2 to S4 to ensure the integrity and non-repudiation of the unlock request, thereby preventing malicious individuals from using other devices to send fraudulent unlock requests to unlock the electronic lock 2. Therefore, the control system 1 of this disclosure is able to balance both the security and convenience of the wireless sensing unlocking mechanism of the electronic lock 2, thus effectively alleviating some of the drawbacks of the prior art.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A control system for an electronic lock, the electronic lock being mounted on a door and having a locked state for preventing the door from being opened and an unlocked state for allowing the door to be opened, said control system comprising:

a control module configured to communicate with a portable device for receiving an unlock request that includes a digital signature and a request identifier therefrom, said control module including:

a processing unit adapted to be electrically connected to the electronic lock, and a storage electrically connected to said processing unit, and storing a key and a registered identifier, wherein said processing unit is configured to, in response to receipt of the unlock request, verify the digital signature included in the unlock request using the key stored in said storage, in response to successfully verifying the digital signature, determine whether the request identifier included in the unlock request matches the registered identifier stored in said storage, and in response to determining that the request identifier matches the registered identifier, control the electronic lock to switch from the locked state to the unlocked state, wherein said storage further stores plural sets of specification-verifying data respectively for verifying a plurality of communication specifications, and a plurality of reference codes that correspond respectively to the plurality of communication specifications, the plurality of communication specifications being related respectively to different types of data format, wherein said processing unit is further configured to, before receiving the unlock request from the portable device, select one of the plurality of communication specifications, and output one of the plurality of reference codes that corresponds to the one of the plurality of communication specifications thus selected, and wherein said processing unit is further configured to, in response to receipt of the unlock request, first determine whether a type of data format of the unlock request matches the one of the plurality of communication specifications thus selected based on a corresponding one of the plural sets of specification-verifying data, and then verify the digital signature using the key when said processing unit determines that the type of data format of the unlock request matches the one of the plurality of communication specifications thus selected.

2. The control system as claimed in claim 1, the door having two sides, wherein said control module further includes a proximity sensor that is electrically connected to said processing unit, and that is configured to detect presence of a nearby object around one of the two sides of the door and to output a detection signal indicating a detection result to said processing unit; and wherein said processing unit is further configured to control said proximity sensor to start detecting presence of a nearby object, and to control the electronic lock to switch from the locked state to the unlocked state in response to determining that the request identifier matches the registered identifier and that said proximity sensor has detected a nearby object according to the detection signal.

3. The control system as claimed in claim 2, wherein, in response to determining that the request identifier matches the registered identifier, said processing unit is configured to first control said proximity sensor to start detecting presence of a nearby object, and then control the electronic lock to switch from the locked state to the unlocked state in response to determining that said proximity sensor has detected a nearby object according to the detection signal.

4. The control system as claimed in claim 1, further comprising the portable device, wherein the portable device is configured to wirelessly receive the one of the plurality of reference codes outputted by said processing unit, generate the unlock request based on the one of the plurality of communication specifications that corresponds to the one of the plurality of reference codes, and wirelessly transmit the unlock request thus generated to said processing unit.

5. The control system as claimed in claim 4, wherein the portable device has a standby mode, and is configured to automatically receive the one of the plurality of reference codes, generate the unlock request and transmit the unlock request when the portable device is in the standby mode.

6. An operation method of a control system for an electronic lock, the control system including a control module, the control module being configured to communicate with a portable device for receiving an unlock request therefrom, the unlock request including a digital signature and a request identifier, the control module including a processing unit and a storage that is electrically connected to the processing unit, the processing unit being electrically connected to the electronic lock, the storage storing a key and a registered identifier, the storage further storing plural sets of specification-verifying data respectively for verifying a plurality of communication specifications, and a plurality of reference codes that correspond respectively to the plurality of communication specifications, the plurality of communication specifications being related respectively to different types of data format, the electronic lock being mounted on a door and having a locked state that prevents the door from being opened and an unlocked state that allows the door to be opened, said operation method comprising, by the processing unit:

in response to receipt of the unlock request, verifying the digital signature included in the unlock request using the key stored in the storage;

in response to successfully verifying the digital signature, determining whether the request identifier included in the unlock request matches the registered identifier stored in the storage;

in response to determining that the request identifier matches the registered identifier, controlling the electronic lock to switch from the locked state to the unlocked state; and before receiving the unlock request from the portable device, selecting, by the processing unit, one of the plurality of communication specifications, and outputting one of the plurality of reference codes that corresponds to the one of the plurality of communication specifications thus selected, wherein verifying the digital signature includes, in response to receipt of the unlock request, first determining whether a type of data format of the unlock request matches the one of the plurality of communication specification thus selected based on a corresponding one of the plural sets of specification-verifying data, and then verifying the digital signature using the key in response to determining that the type of data format of the unlock request matches the one of the plurality of communication specifications thus selected.

7. The operation method as claimed in claim 6, the door having two sides, the control module further including a proximity sensor that is electrically connected to the processing unit, and that is configured to detect presence of a nearby object around one of the two sides of the door and to output a detection signal indicating a detection result, the operation method further comprising:

by the processing unit, controlling the proximity sensor to start detecting presence of a nearby object, wherein controlling the electronic lock to switch from the locked state to the unlocked state includes controlling the proximity sensor to start detecting presence of a nearby object and controlling the electronic lock to switch from the locked state to the unlocked state in response to determining that the request identifier matches the registered identifier and that the proximity sensor has detected a nearby object according to the detection signal.

8. The operation method as claimed in claim 7, wherein controlling the electronic lock to switch from the locked state to the unlocked state includes:

in response to determining that the request identifier matches the registered identifier, first controlling the proximity sensor to start detecting presence of a nearby object; and then, controlling the electronic lock to switch from the locked state to the unlocked state in response to determining that the proximity sensor has detected a nearby object according to the detection signal.

9. The operation method as claimed in claim 6, the control system further including the portable device, the operation method further comprising:

by the portable device, wirelessly receiving the one of the plurality of reference codes outputted by the processing unit, generating the unlock request based on the one of the plurality of communication specifications that corresponds to the one of the plurality of reference codes, and wirelessly transmitting the unlock request thus generated to the processing unit.

10. The operation method as claimed in claim 9, the portable device having a standby mode, wherein, in the standby mode, the portable device automatically performs receiving the one of the plurality of reference codes, generating the unlock request and transmitting the unlock request.

* * * * *